United States Patent [19]

Manning

[11] Patent Number: 5,760,889
[45] Date of Patent: Jun. 2, 1998

[54] APPARATUS FOR THE MEASUREMENT OF CURVATURE OF A SURFACE

[75] Inventor: Kevin Ross Manning, Southampton, United Kingdom

[73] Assignee: Roke Manor Research Limited, Hampshire, England

[21] Appl. No.: 578,515

[22] PCT Filed: May 25, 1995

[86] PCT No.: PCT/GB95/01198

§ 371 Date: Dec. 27, 1995

§ 102(e) Date: Dec. 27, 1995

[87] PCT Pub. No.: WO95/33181

PCT Pub. Date: Dec. 7, 1995

[30] Foreign Application Priority Data

May 28, 1994 [GB] United Kingdom .............. 9410792
Jun. 3, 1994 [GB] United Kingdom .............. 9411121

[51] Int. Cl.⁶ .................. G01B 9/00; G01B 11/00; G01B 11/14
[52] U.S. Cl. .................. 356/124; 356/372; 356/376
[58] Field of Search .................. 356/124, 376, 356/377, 379, 380, 384; 351/212, 247; 347/236, 246, 241, 243, 256, 259, 260

[56] References Cited

U.S. PATENT DOCUMENTS

| 4,495,386 | 1/1985 | Brown et al. | 179/2.51 |
|---|---|---|---|
| 4,537,373 | 8/1985 | Maschmeyer | 350/432 |
| 4,588,270 | 5/1986 | Tamaki | 351/212 |
| 4,701,945 | 10/1987 | Pedigo | 347/243 |
| 5,461,412 | 10/1995 | Paoli et al. | 347/243 |

FOREIGN PATENT DOCUMENTS

| 0078062 | 5/1983 | European Pat. Off. . | |
| 0561178 | 9/1993 | European Pat. Off. . | |
| 1 548 652 | 7/1979 | United Kingdom . | |
| 2078394 | 1/1982 | United Kingdom . | |
| 2268263 | 1/1994 | United Kingdom . | |
| 2267263 | 5/1994 | United Kingdom | 11/6 |

Primary Examiner—Frank G. Font
Assistant Examiner—Michael P. Stafira
Attorney, Agent, or Firm—Hill & Simpson

[57] ABSTRACT

An apparatus for the measurement of the curvature of a surface is provided. The apparatus has at least one source of electromagnetic radiation, a two-dimensional electromagnetic radiation detector and a lens, positioned to focus source radiation reflected from the surface onto the detector. A beam splitter is positioned between the detector and the surface via which radiation from the source is directed onto the surface. A calculating device is provided for calculating the measurement from signals detected by the detector. A scanning device is provided which causes a beam of radiation from the source to be scanned across the surface, thereby producing a multiplicity of beams which are reflected from the surface via the lens where a reflected angle of each beam is transformed in a physical displacement on the detector. The scanning device may be a scanning mirror prism or a light shutter used in combination with a further lens.

11 Claims, 6 Drawing Sheets

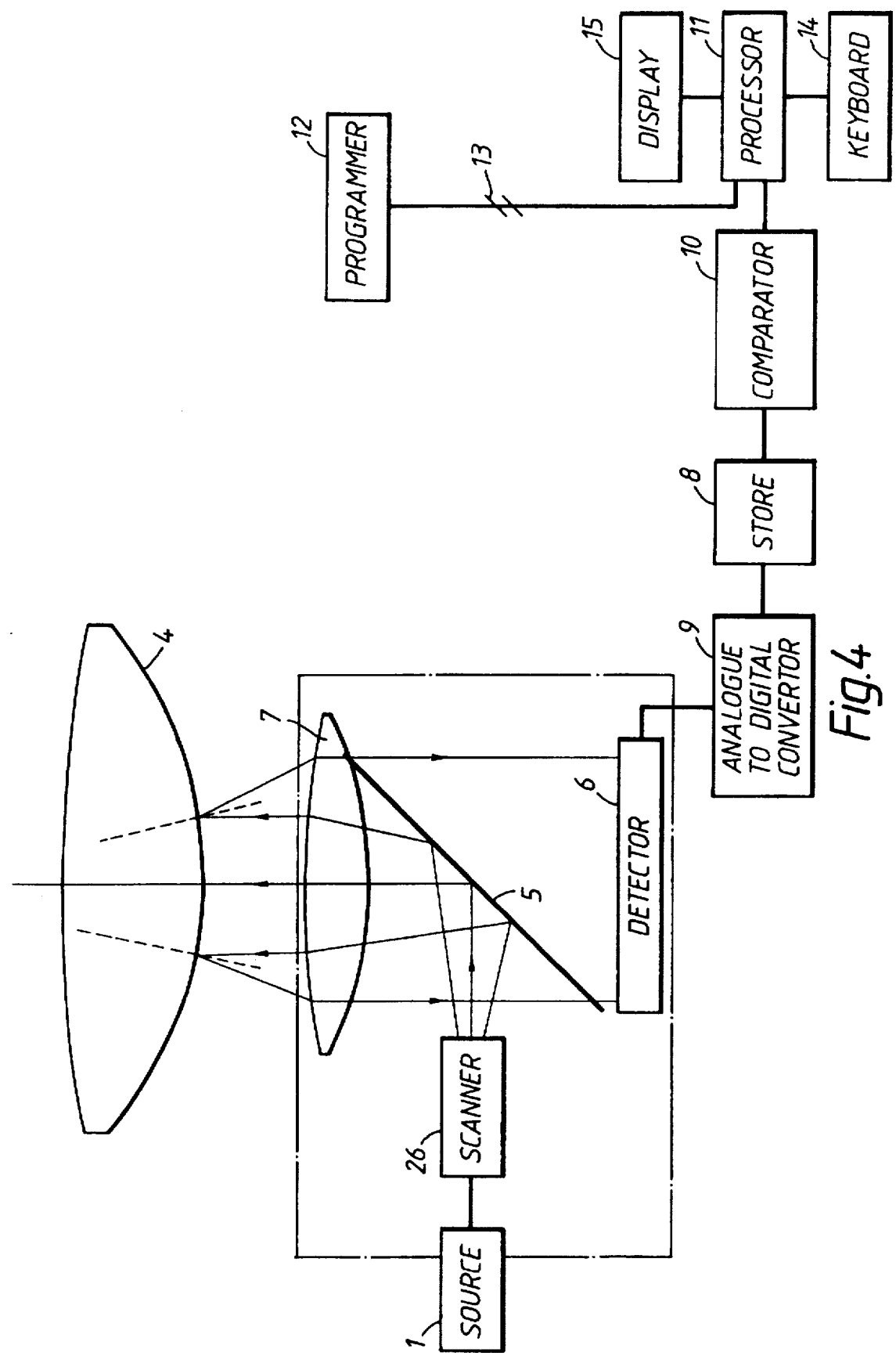

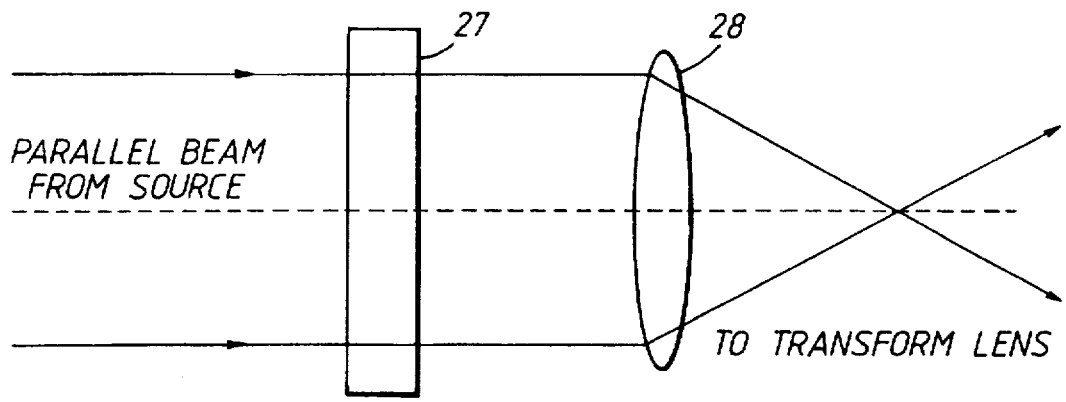
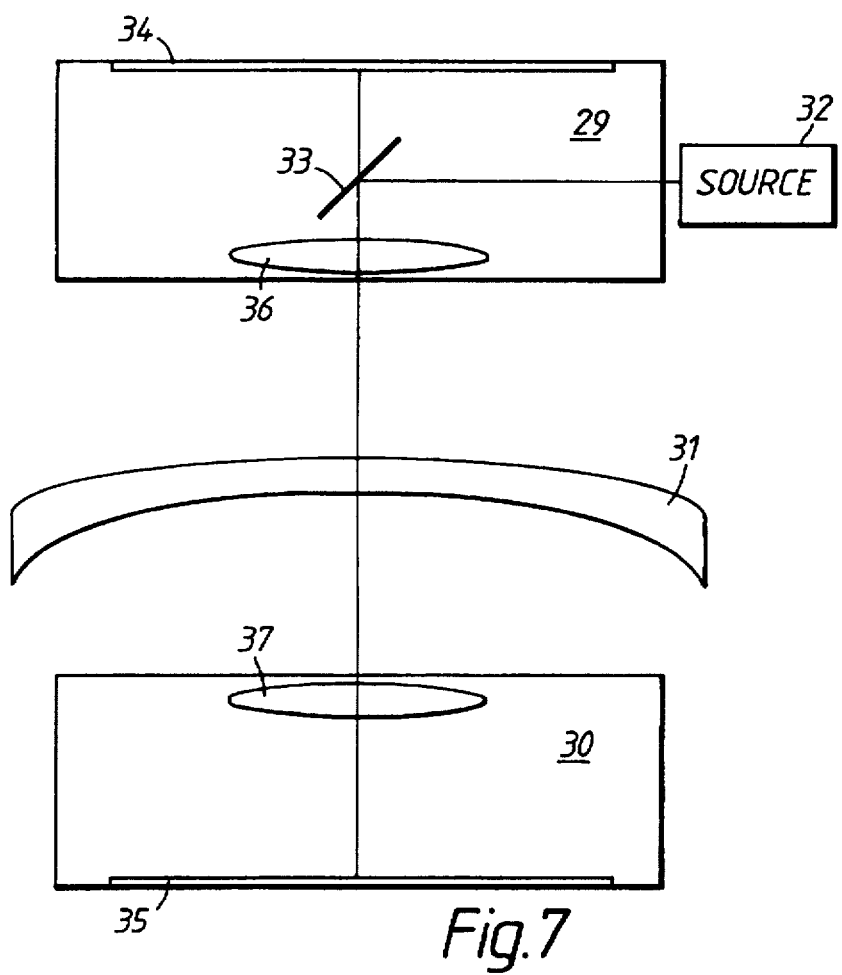

APPARATUS FOR THE MEASUREMENT OF CURVATURE OF A SURFACE

BACKGROUND OF THE INVENTION

This invention relates to apparatus for the measurement of the curvature of a surface.

More especially although not exclusively it relates to apparatus for affording, on a production line for example, a simple but accurate indication of whether the surface curvature of a product being manufactured is within a curvature specification, together with an indication of any deviation from a required curvature specification.

SUMMARY OF THE INVENTION

One embodiment of the invention relates in particular to a measure of the radii of curvature of spectacle lenses in order that accurate lenses can be manufactured. With the requirement to measure the radius of curvature of spectacle lenses to an accuracy greater than is presently possible, a need also exists for an instrument to accurately measure the radii of curvature across zones of a lens, to measure the power of a lens and also to measure prism power. Additionally, a need has arisen for the measurement of lenses on a production line for identification prior to packaging so that the correct lens power can be printed on the package.

A further embodiment of the invention relates to a problem where the radii of curvature of contact lenses is required to be measured in order that accurate lenses could be manufactured. With the requirement to measure the radius of curvature of the contact lens with an accuracy greater than is presently possible, the need exists for an instrument to objectively, and accurately, measure the radii of curvature across the zones of the lens.

It is therefore an object of the present invention to provide apparatus which will satisfy the aforementioned needs whereby the rapid and accurate measurement of lenses is facilitated.

According to the present invention there is provided apparatus for measurement of the curvature of a surface, comprising at least one source of electromagnetic radiation, electromagnetic radiation detector means, lens means positioned and arranged to focus source radiation reflected from said surface onto said detector means, a beam splitter positioned between said detector means and the surface, via which radiation from said source is directed onto the surfaces, and means for calculating said measurement from signals detected by said detector means. The detector menus is a two dimensional detector. A scanning means is provided which causes a beam of radiation from said source to be scanned across the surface, thereby producing a multiplicity of beams which are reflected from said surface via said lens means where a reflected angle of each beam is transformed in physical displacement on said detector means.

In an embodiment, the scanning means may be in the form of a scanning mirror prism.

In an embodiment, the scanning means may be in the form of a light shutter used in combination with a further lens means.

The light shutter comprises an addressable array of light switches.

The apparatus may be used to control a cutting tool, or may be used in a sorting process.

Some embodiments of the present invention will now be described by way of example only with reference to the accompanying drawings.

BRIEF DESCRIPTION OF THE DRAWINGS

FIG. 4 is a block schematic diagram of a lens testing system using multibeams of the present invention.

FIG. 5 is a block schematic diagram showing in more detail a scanner for use in the system shown in FIG. 4 of the present invention.

FIG. 7 is a block schematic diagram showing an alternative lens measurement system

DETAILED DESCRIPTION OF THE PREFERRED EMBODIMENTS

For background information appertaining to lens measurement systems to which the present specification relates, reference should be made to GB co-pending patent application number 9213626.6, which relates to an AMROC™ lens measurement system.

Figure 1:
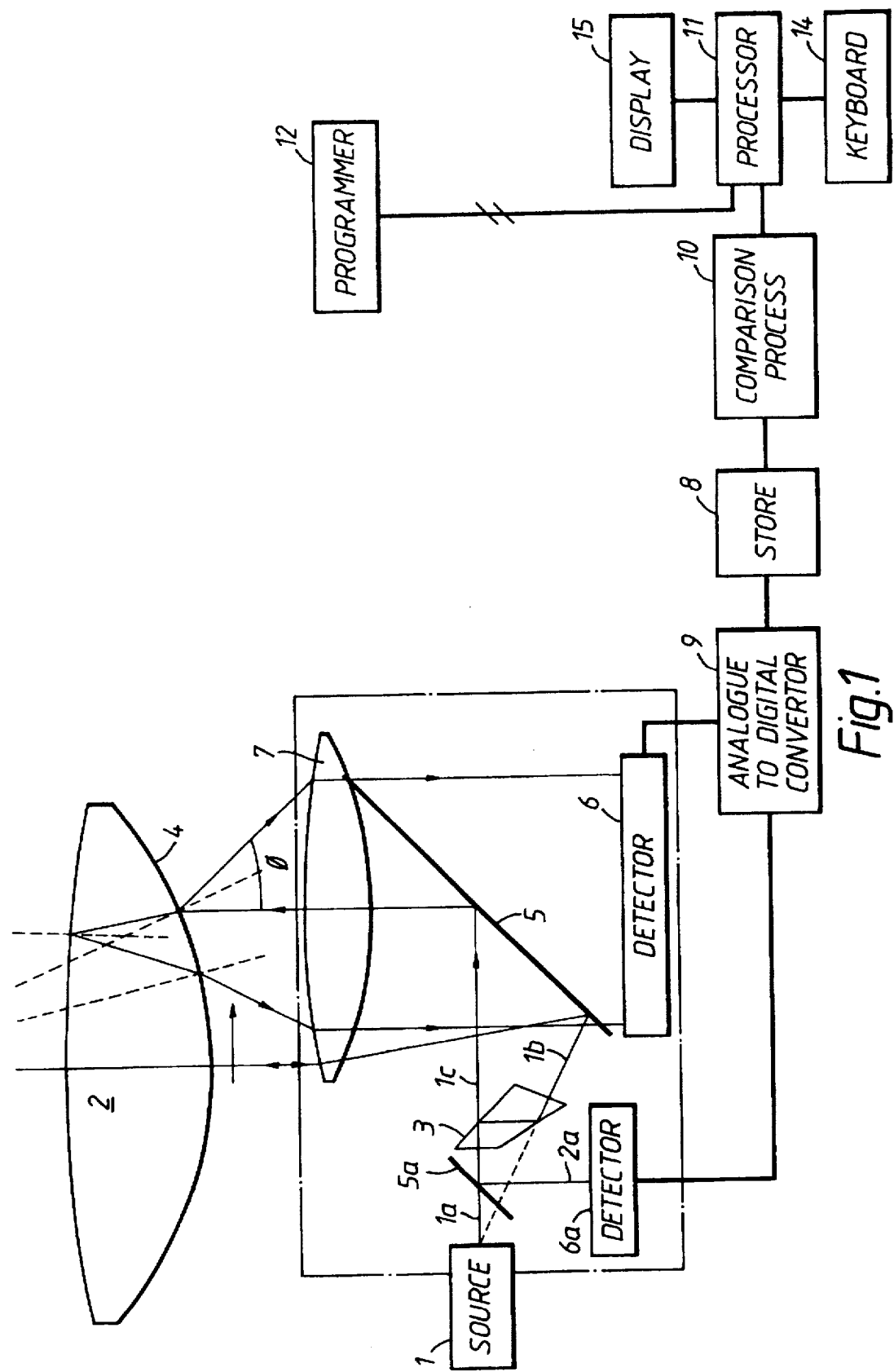
FIG. 1 is a block schematic diagram of Go/No Go lens measurement apparatus of the present invention.

Referring now to FIG. 1, the apparatus comprises a laser source 1 which may be arranged to emit light in a visible or non-visible spectrum but which, if emitting light in the visible range wavelengths, will provide an indication to an operator of where on a lens 2 measurements are being made. The laser 1 emits a collimated beam 1a which is split into two beams 1b and 1c, by a prism 3. The beams 1b and 1c are directed onto a surface 4 of the lens 2 by a beam splitter 5. One method of determining the radius of curvature initially requires determination of the location of a normal 2a to the surface 4 and methods and apparatus for this determination are fully described in GB co-pending patent application number 9213626.6. Having discovered the location of the normal using beam 1b, the normal is used as a reference for subsequent calculations of the radius of curvature of the surface 4. The beam 1c, which is reflected from a position which is a known distance from the beam 1b, is focused onto a detector 6 by a transform lens 7. The transform lens 7 converts angular displacement to a physical displacement at the detector 6. The reflected beam position from the surface 4 is recorded in a store 8, immediately after the position of the normal 2a has been determined and this information is then used to calculate the radius of curvature as explained in the GB co-pending patent application referred to above. The store 8 is served from the detector 6 via an analog to digital A/D converter 9. The A/D convertor 9 receives a flag signal derived from the detector 6a and the beam splitter 5a. The flag signal indicates that a valid reading can be taken from the detector 6 when the beam normal to the surface 4 is present. The calculated value of radius of curvature is compared in a comparator 10 with pre-programmed data derived in dependence upon design parameters which define an ideal lens and acceptable Go/No Go limits. The design parameters may conveniently be contained in the store 8 or in a processor 11 which serves to monitor the measurement process and the results of comparison. The design parameters may be varied in accordance with the required application and programmed into the processor 11 by means of a programmer 12 which can be coupled to the processor 11 by a connector 13 (shown schematically). Processor control may be effected through a keyboard 14 and the results of measurement may be displayed on a display screen 15 in any convenient form.

It will be appreciated that having been programmed by data from the programmer 12, the apparatus can operate independently of the programming unit 12 until new Go/No Go design parameters defining new radius of curvature limits are required and programmed.

Figure 2:
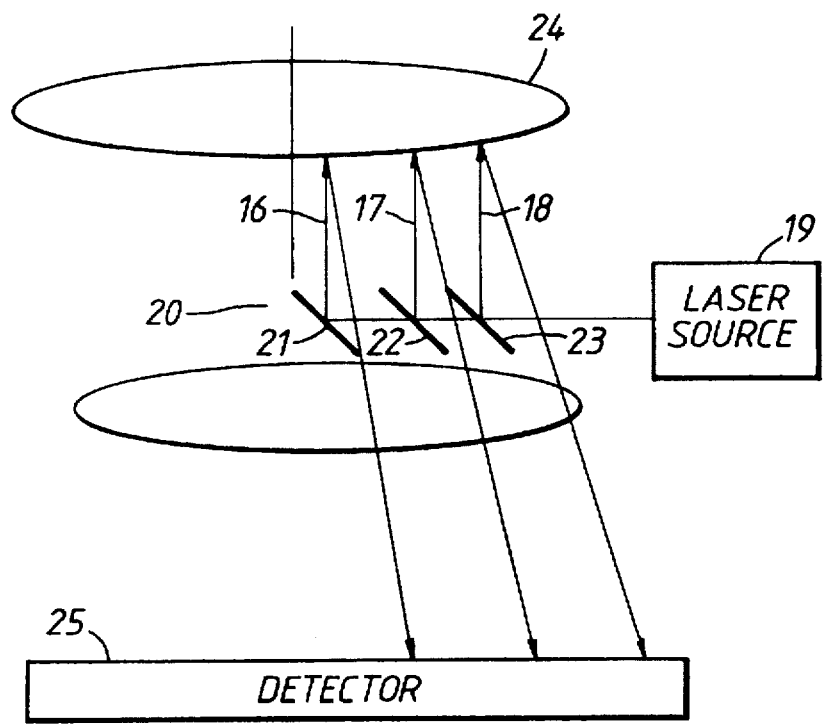
FIG. 2 is a block schematic diagram of a multibeam detector system for use in the system of FIG. 1 of the present invention.

In an alternative method of measurement, the normal is not required to be found and this alternative method operates on similar principles to a spherometer but is non-contact and potentially more accurate. As shown in FIG. 2, in this alternative method, two or more parallel beams 16, 17 and 18 are produced using a laser source 19 which is directed onto a three element beam splitter 20 having elements 21, 22 and 23 which produce the beams 16, 17 and 18 respectively. The beams 16, 17 and 18 are mutually parallel and displaced a known predetermined distance apart. Reflections of these beams from a surface 24 of the lens under test are received by a detector 25. Data appertaining to the reflected beam positions as determined by the detector 25 is stored in a memory and used to calculate the radius of curvature of the surface 24 under test.

Figure 3:
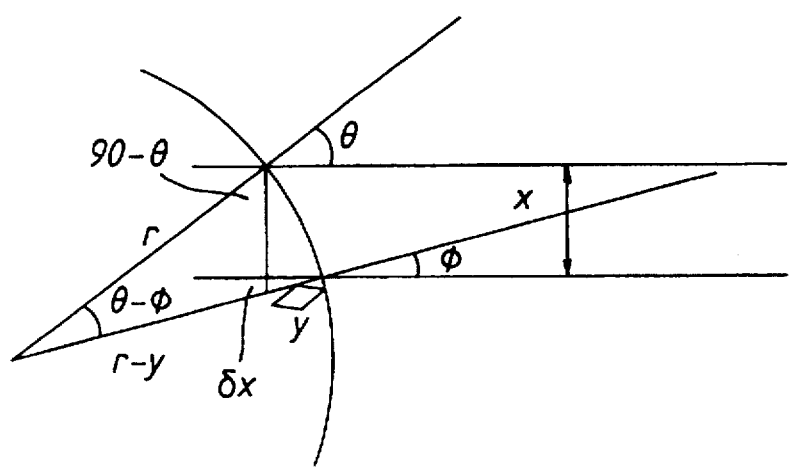
FIG. 3 is a block schematic diagram showing the parameters of a dual beam system of the present invention.

It can be shown as indicated by the following equation that a simple relationship obtains between the two measured angles θ and o; a distance x between the beams, and; a required radius of curvature, as shown in FIG. 3.

It is of course necessary to distinguish between reflected returns from various input beams. One way of achieving this is to activate each beam separately such that the return or returns for back surface reflections are uniquely identified. This could be accomplished for example by having separate lasers for each beam position and switching them on in sequence. Another way to accomplish this would be to use polarized light and separate detectors for each polarization. This latter method removes the requirement to determine the normal before the measurement is made. It should be noted, however, that for widely spaced beams this method will only be accurate for spherical surfaces. However, if the beams are close to each other, then the method will work for any smooth surface profile.

By using a series of beams, which could be discrete lasers or a single laser plus a beam splitter, it is possible to determine the local radius of curvature, and by taking pairs of beams at different distances apart it is possible to determine the general radius of curvature. The arrangement of FIG. 2 shows apparatus which could be adapted for this purpose.

With the use of pairs of beams it is possible to isolate bi-focal additional power regions, known as 'add' regions, from the main surface and determine their radius of curvature. By making use of the reflections from the rear surfaces it is possible to determine the power of the lens. A multibeam unit may be used on a production line for identifying a particular type of lens. From measured radii of curvature it is possible to determine the lens power from look up tables. This information can be used for printing labels for envelopes in which lenses are packaged and/or for continuous production line checking to determine when lens molds are going out of specification.

The 'add' regions of a bi-focal lens may be measured by making measurements across a lens and, for example, by using a multiplicity of beams from multiple laser sources and making use of the return angles from pairs of beams to determine the radius of curvature. By making use of pairs it is possible to isolate the radii from the main surface and from the 'add' regions. The above method will work well for semi-finished and for stock lenses.

An alternative method to using multiple beams is as shown in FIG. 4, wherein parts corresponding to FIG. 1 bear the same numerical designations. In this alternative arrangement a beam from the source 1 is scanned across the surface 4 by a scanning mirror prism arrangement 26 positioned at the focus of the transform lens 7. Alternatively, as shown in FIG. 5, a light shutter 27 may be used in combination with a lens 28. Continuous or variable sample intervals may thereby be provided for providing a profile of the surface.

Measurements can be accomplished in real time so that as a surface is machined an output from a measurement unit is used to control a cutting tool. This thus provides an automatic system which will modify machining as required or stop a machine when a required radius of curvature or profile has been achieved. Apparatus could be fabricated which is hand held or affixed to a lathe or stock temporarily so as to be near the surface to be tested.

The following is the equation for determining the radius of curvature, r, using two parallel beams a known distance, x, apart, as shown in FIG. 3.

$$r = \frac{r}{\sin\theta - \sin\phi}$$

where:
  r=required radius of curvature;
  x=beam separation;
  θ=upper measured angle of surface normal;
  φ=lower measured angle of surface normal.

It will be appreciated that, by using wavelength diversity for each of a plurality of lasers, one can isolate the lasers by the use of wavelength filters and use linear detectors for each wavelength. Using this technique it is possible to have the beams very close together, i.e. small x, and still have resolution between the returns. This can be of benefit to the mechanically scanned AMROC™, where improved resolution of the radius of curvature is obtained.

FIG. 4 shows a variant of FIG. 1 where the prism 3 has been replaced by a scanning system which provides a multiplicity of beams. These beams can be scanned across the surface under investigation by the scanner 26. These beams exit from the transform lens 7 parallel to the optical axis, as in FIG. 1. When these beams fall on a surface under test, they are reflected back toward the transform lens 7 where the reflection angle is transformed into a physical displacement on the detector 6. By making use of the above equation, it is possible to determine the radius of curvature by making use of sets of beams, which may be adjacent to each other or diverse from each other. The output can then be displayed as explained in the GB co-pending patent application referred to above.

The beams can be also be brought parallel to the optical axis of the transform lens 7 by the use of a beam splitter between the transform lens 7 and the surface under test.

The scanner of FIG. 4 may be as shown in FIG. 5 and consist of the lens 28 and an addressable array of light switches which serve to define the shutter 27. The source (not shown) for the array consists of a parallel beam that covers the entire addressable array. The addressable array consists of a matrix of small light shutters which are normally opaque but which transmit light when switched on.

Therefore by having a matrix of these shutters it is possible to generate any beam parallel to the optical axis of the transform lens 7. Therefore it is possible to scan the beam, or beams, over the rest surface without the use of mechanical sliders. This makes it possible to significantly speed up the measurement process.

Figure 6:
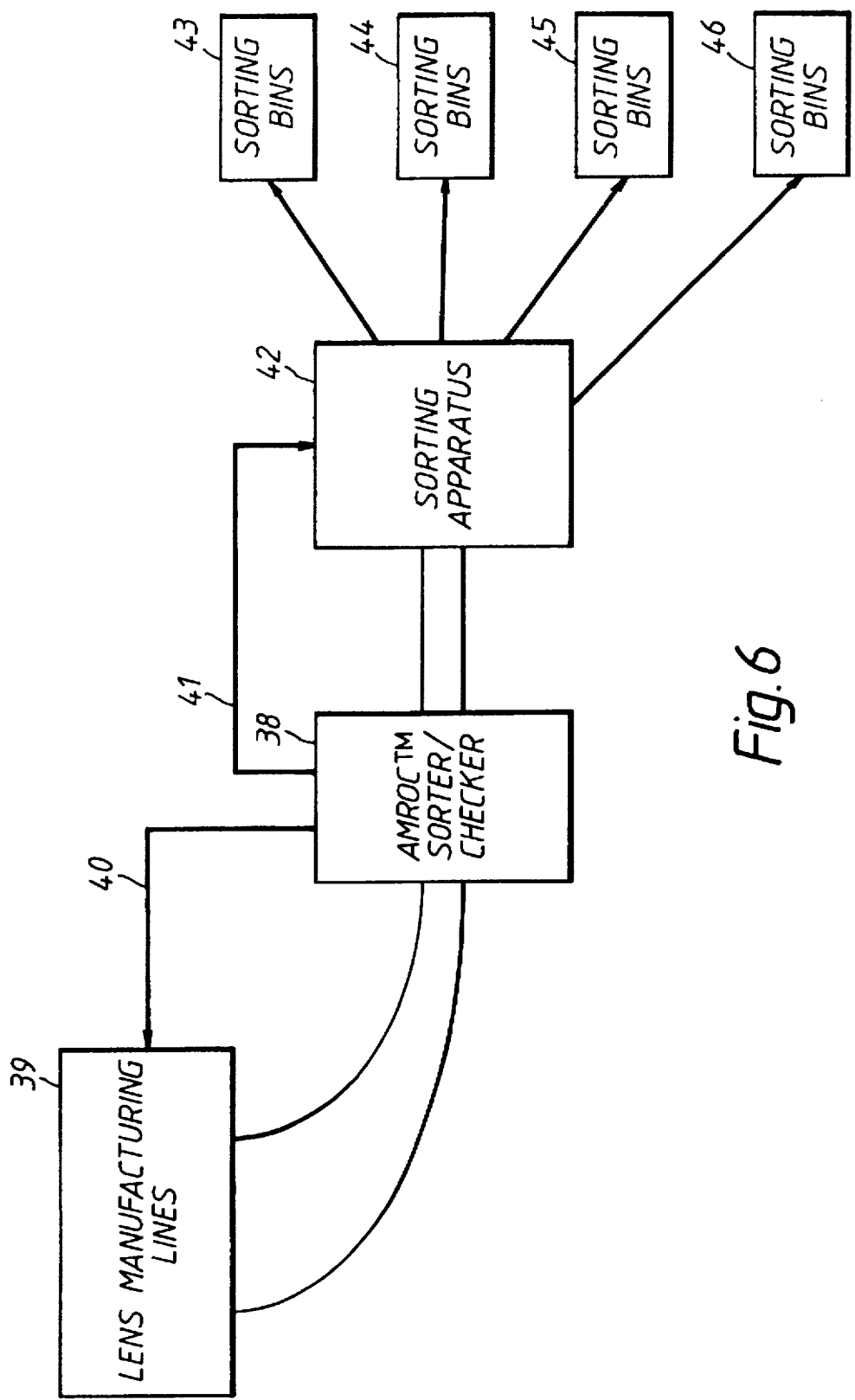
FIG. 6 is a somewhat schematic block diagram showing a production line control system using an AMROC™ lens sorter/checker of the present invention.

FIG. 6 shows a scenario where an AMROC™ Go/No Go unit, or multi-beam variant 38, is used to control a lens or spectacle production line 39. As the lenses are released from the manufacturing process they are passed to various conveyor belts that flow into one. If the AMROC™ unit 38 is positioned at this point it is possible to control sorting apparatus 42 via a line 41 so as to sort the lenses into various output ports, e.g. storage bins 43, 44, 45 and 46 for a 'standard' range of outer surfaces. The unit would be programmed with the various 'standard' radii of curvature and having measured the lens as it passed would send control signals to the sorting apparatus 42 for placing the lenses into their correct storage bins or machining bins. In addition, the results obtained from the unit can be used to control, via a line 40, the manufacturing process. This could be of significant importance as lenses can be manufactured at approximately one per second and with the feedback it is possible to determine when the surfaces are going out of specification. The earlier the errors are detected the less scrap lenses will be manufactured and the down time for refurbishment of the manufacturing process is thus minimized.

FIG. 7 shows a schematic diagram of one variant of the invention for measuring spectacle lenses, wherein an AMROC™ head 29, having a source 32, a detector 34, a beam splitter 33 and a transform lens 36 is positioned such that it is above a spectacle lens 31 to be tested. As with the basic methods shown in the co-pending patent application previously mentioned, the head 29 scans across the lens 31 under test and measures the return angles from the specular returns. From these return angles, and with knowledge of the position relative to the normal from the surface, the radius of curvature of the surface can be calculated. As the head 29 is free to rotate about the normal to the surface it is possible to measure the entire surface. This method can also be used to measure any internal or rear surfaces. With the front and back surfaces measured for a spectacle lens it is possible to determine the refractive index of the material. If another head 30 is incorporated on the transmission side of the spectacle lens 31, it is possible to deduce the power of the lens and the prism power between the surfaces. This head 30 will measure the angle which the transmitted beam makes with the incident beam, which impinges at a known location on the front surface. This measurement therefore provides information about the power of the lens 31 and can also supply the prism power between the two surfaces. The lower head 30 could consist of a transform lens 37 with a detector 35 or with a laser source (not shown) that shines towards the upper head. Thus, its position is registered on the detectors incorporated within it.

In an embodiment of the present invention, toric spectacle lenses which include progressive and astigmatic lenses can be measured in two orthogonal planes.

Figure 8:
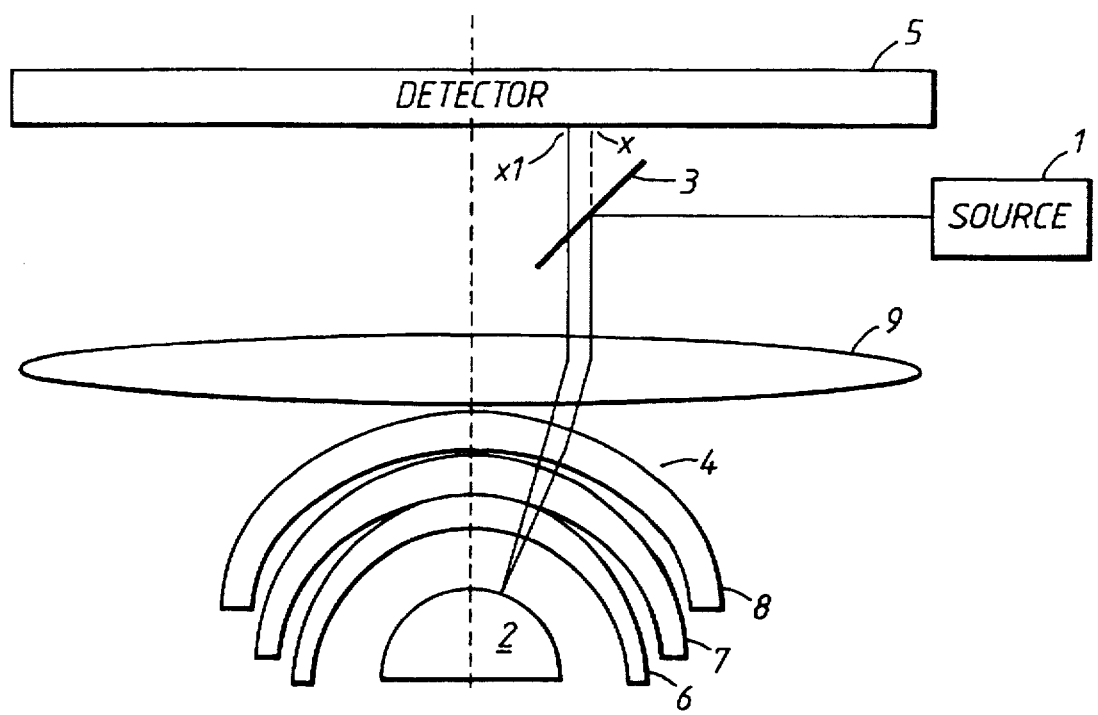
FIG. 8 is a block schematic diagram of apparatus for measuring the surface of contact lenses of the present invention.

Referring to FIG. 8, a schematic diagram of a variant for contact lens and/or eye cornea measurement is shown.

As a contact lens has a limited range of surface radii of curvature, it is possible to have an optical system which wraps around the contact lens and which can therefore look at the surface quickly. Using this method, input rays would be very nearly normal to the surface and thus for a good surface, a ray would be reflected back close to its input path. Should the surface not be good, then the ray will not be reflected back to its predicted position. This deviation or perturbation from the normal can therefore be measured using a detector array and then used to determine the surface radii of a curvature and deviation from a 'perfect' surface.

In the drawing of FIG. 8, rays from a light source 1 which may be laser, are directed onto a contact lens 2 via a beam splitter 3 and a main transform lens 4. The rays impinge upon the contact lens 2 and are reflected through the transform lens 4. They are then directed to a detector 5 after passing through the beam splitter 3. If the lens 2 is perfect, the rays will intercept the detector 5 at a point x, whereas any imperfections will cause the rays to intercept the detector 5 at a point x1, for example. The lens 4 which directs the rays to and from the contact lens 2 will consist of a series of onion skin elements 6, 7 and 8 nested together, which progressively bend the rays from the extremities of the contact lens 2 to shallower angles. These elements 6, 7 and 8 may each be of low power, but the combination makes a very powerful lens which can accept a range of angles from the edges of the contact lens 2. These rays can then be intercepted by another lens 9 which directs the reflected rays onto the detector 5.

The rays can be directed to different positions on the contact lens 2 by moving the source 1 and/or by using a series of discrete beams. If the beam splitter 3 is designed to cover the entire detector area, then this will ensure that no errors are generated by deviation within the beam splitter 3. By rotating the contact lens 2 relative to the measurement lens 4 or vice versa, measurement of the complete surface of the contact lens 2 is facilitated. In addition, the beam splitter 3, the detector 5 and the source 1 could be separate from the main transform lens 4, it would then be possible to rotate the parts 1, 3 and 5 relative to the lens 2 and the transform lens 4 and build up the surface from these measurements. By using a series of discrete beams over the entire surface of a contact lens and by using a 2D detector array, it is possible to obtain surface information very quickly.

By having a large beam it is possible to measure the average radius of curvature. By having an enlarged beam impinging on the surface of a contact lens, the extremities of a return beam provide a very accurate measurement of the average radius of curvature, which is of course equivalent to two beams, the diameter of the large beam apart, the information afforded being provided however without scanning.

In the fabrication of testing of contact lenses, measurements are required of the radii of curvatures of the optical zone of a lens, the outer zone of the lens and the intermediate zone, all on the front surface of a lens. Additionally, two zones on the rear surface are required, both for hard and soft contact lenses. The measurements are made while the lenses are immersed in a fluid, usually a saline solution. In addition, a measurement of the refractive index is also required which can be made available with the present apparatus.

Lens power can be determined by incorporating an optical measurement head, hereinafter called an AMROC™ head of the kind described in GB co-pending patent application number 9213626.6 and 9211233.3, consisting of a transform lens and detector on the transmitted beam side of the lens. This will serve to measure the angle that a transmitted beam makes with an incident beam which impinges at a known location on the front surface, and from this angle, the power of a lens as a whole can be determined. The foregoing measurement can also supply information appertaining to the prism power between the two surfaces.

Intra-ocular lenses can also be measured using the apparatus and method of the present invention. With intra-ocular lenses the thickness of the lens may be such that the returns from the two surfaces are too close together to resolve. However, one way around this problem is to 'float' the intra-ocular lens on an index matching fluid and thus remove the return from the rear surface. To measure the rear surface, one would turn the intra-ocular lens over.

In addition to measuring the contact lens directly, an important additional application is the control of the cutting tool on a lathe used to cut contact lenses or intra-ocular lenses. For this embodiment of the present invention, a unit for setting up a contact lens and/or intra-ocular lens lathe is provided which provides data for checking and feeding back to a lathe controller, whereby automatic manufacture is facilitated. This variant would operate in a single diametric chord with the motions being provided by a rotating chuck and a cutting tool feed of a lathe if an optical head is attached to the tool head. This will allow a cutting path to be determined by measuring the radius of curvature generated by the tool and comparing this with reference data which defines a required cut.

As a by-product of measuring the surface radius of curvature, a statement of the roughness can be deduced. This is accomplished by measuring the amplitude and the size of the return spot on the detector, taking account of the spreading of the beam by the surface itself. This return could be from each individual measurement or from an average measurement of radius of curvature using a large beam. As the surface becomes less of a reflector and more of a diffuse scatterer, the limit being a Lambertian scatter, then the amplitude and the size of the beam will alter. A measurement of the deviation from that from a 'perfect' reflector will allow an accurate determination of the surface roughness to be made. This statement will enable an assessment to be made, say via a threshold level, as to when a tool needs to be changed and/or reset.

As a contact lens is designed to be affixed on the eye, this method for measuring the radius of curvature can be used to determine the radii of curvature of the eye itself. The method and apparatus of the present invention will also permit the internal lens of an eye to be measured, which cannot be done with presently known apparatus.

Although other modifications and changes may be suggested by those skilled in the art, it is the intention of the inventor to embody within the patent warranted hereon all changes and modifications as reasonably and properly come within the scope of his contribution to the art.

I claim:

1. An apparatus for measuring curvature of a surface, comprising:

at least one source of electromagnetic radiation, a scanner means which operates in combination with said at least one source of radiation to generate a plurality of beams of radiation directed towards a beam splitter, said plurality of beams of radiation being reflected by said beam splitter so as to pass through a transform lens disposed between said beam splitter and said surface to be measured, wherein said transform lens serves to refract said plurality of beams so that as said beams exit from a front face of said transform lens adjacent said surface, said plurality of beams are mutually parallel, and on reflection from said surface said plurality of beams are again caused to pass through said transform lens, and are again refracted by said transform lens so that as said beams exit from a rear face of said transform lens said plurality of beams are arranged to be incident on a two dimensional detector;

said two dimensional detector operating to generate signals representative of a position on said detector at which each of said plurality of beams are incident, which signals are fed to a data processor means, which operates to perform said measurement of surface curvature consequent upon said signals being representative of a linear displacement of each of said plurality of beams effected in dependence upon an angle of reflection of said beams from said surface.

2. Apparatus for measuring the curvature of a surface, comprising:

at least one source of electromagnetic radiation;

a two dimensional electromagnetic radiation detector;

lens device positioned and arranged to focus source radiation reflected from said surface onto said detector;

a beam splitter positioned between said detector and the surface, via which radiation from said source is directed onto the surface;

calculating device a measurement from signals detected by said detector; and a scanning device for scanning a beam of radiation from said source across the surface, thereby producing a multiplicity of beams which are reflected from said surface via said lens device where a reflected angle of each beam is transformed as a physical displacement on said detector;

generator for generating an output signal indicative of said measurement to control a cutting tool responsive to the output signal during a machining process of the surface.

3. Apparatus for measuring the curvature of a surface, comprising:

at least one source of electromagnetic radiation;

a two dimensional electromagnetic radiation detector;

lens device positioned and arranged to focus source radiation reflected from said surface onto said detector;

a beam splitter positioned between said detector and the surface, via which radiation from said source is directed onto the surface;

means for calculating device a measurement from signals detected by said detector; and a scanning device for scanning a beam of radiation from said source across the surface, thereby producing a multiplicity of beams which are reflected from said surface via said lens device where a reflected angle of each beam is transformed as a physical displacement on said detector;

controller for controlling a sorting apparatus so that each lens is passed to a particular output port depending upon the measured surface curvature of each lens.

4. Apparatus as claimed in claim 1, wherein the scanning means is a scanning mirror prism.

5. Apparatus as claimed in claim 1, wherein the scanning means is a light shutter used in combination with a further lens means.

6. Apparatus as claimed in claim 1, wherein the light shutter comprises an addressable array of light switches.

7. Apparatus as claimed in claim 1, further comprising:

means for generating an output signal indicative of said measurement to control a cutting tool responsive to the output signal during a machining process of the surface.

8. Apparatus as claimed in claim 1, further comprising:

means for controlling a sorting apparatus so that each lens is passed to a particular output port depending upon the measured surface curvature of each lens.

9. Apparatus as claimed in claim 1, wherein said transform lens comprises a plurality of elements which are nested together such that the nested plurality in combination accepts a range of reflected angles of beams from edges of a lens, the surface of which is to be measured.

10. Apparatus as claimed in claim 9, wherein the lens is a contact lens.

11. Apparatus as claimed in claim 1, further comprising:

means for assessing the roughness of the surface measured in dependence upon the amount of scatter of said beam.

* * * * *